(12) United States Patent
Yoshida

(10) Patent No.: US 11,731,706 B2
(45) Date of Patent: Aug. 22, 2023

(54) ROOF SIDERAIL AND VEHICLE

(71) Applicants: TOYOTA JIDOSHA KABUSHIKI KAISHA, Toyota (JP); SUBARU CORPORATION, Tokyo (JP)

(72) Inventor: Sachiko Yoshida, Nisshin (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/713,848

(22) Filed: Apr. 5, 2022

(65) Prior Publication Data

US 2022/0324516 A1    Oct. 13, 2022

(30) Foreign Application Priority Data

Apr. 9, 2021    (JP) ................... 2021-066443

(51) Int. Cl.
*B62D 25/06*    (2006.01)
*B62D 27/02*    (2006.01)

(52) U.S. Cl.
CPC .......... *B62D 25/06* (2013.01); *B62D 27/023* (2013.01)

(58) Field of Classification Search
CPC ....... B62D 25/04; B62D 25/06; B62D 27/023
USPC ........... 296/23.01, 3, 4, 29, 30, 210, 193.06
See application file for complete search history.

(56) References Cited

U.S. PATENT DOCUMENTS

| | | | | |
|---|---|---|---|---|
| 8,944,494 B2 * | 2/2015 | Nakamura | ............. | B62D 25/06 296/193.06 |
| 9,452,788 B2 * | 9/2016 | Anegawa | ............... | B62D 25/04 |
| 2013/0278023 A1 * | 10/2013 | Nakayama | ............. | B62D 25/04 296/203.03 |
| 2014/0138988 A1 * | 5/2014 | Kisaku | ............... | B62D 33/0222 296/210 |
| 2020/0391799 A1 | 12/2020 | Kiyoshita et al. | | |

FOREIGN PATENT DOCUMENTS

| | | | | | |
|---|---|---|---|---|---|
| CN | 108454703 | A | * | 8/2018 | ........... B62D 21/157 |
| JP | 2011-207288 | A | | 10/2011 | |
| JP | 2013180701 | A | * | 9/2013 | |
| JP | 2015131564 | A | * | 7/2015 | |
| JP | 2020-203557 | A | | 12/2020 | |

* cited by examiner

*Primary Examiner* — Dennis H Pedder
(74) *Attorney, Agent, or Firm* — Dinsmore & Shohl LLP

(57) ABSTRACT

In a vehicle, a roof siderail outer includes an upper flange, a first portion that is disposed across a gap from a roof siderail inner, and a second portion disposed between the first portion and the upper flange. A boundary line between the upper flange and the second portion is configured of a first bent portion that is bent to form a valley crease line on an outer face of the roof siderail outer. A boundary line between the second portion and the first portion is configured of a second bent portion that is bent to form a ridge crease line on the outer face. The second bent portion extends toward the first bent portion in a rearward direction, and is connected to the first bent portion. The upper flange is welded to a rear pillar.

8 Claims, 5 Drawing Sheets

ROOF SIDERAIL AND VEHICLE

CROSS-REFERENCE TO RELATED APPLICATION

This application claims priority to Japanese Patent Application No. 2021-066443 filed on Apr. 9, 2021, incorporated herein by reference in its entirety.

BACKGROUND

1. Technical Field

The technology disclosed in the present specification relates to a roof siderail and a vehicle.

2. Description of Related Art

Japanese Unexamined Patent Application Publication No. 2011-207288 (JP 2011-207288 A) discloses a connection structure of a roof siderail and a rear pillar of a vehicle.

SUMMARY

When a vehicle is traveling, a roof siderail may vibrate in a vicinity of a connection portion of the roof siderail and a rear pillar, and noise (i.e., vibration sound) may be generated. The present specification proposes technology for suppressing noise generated in the vicinity of the connection portion of the roof siderail and the rear pillar.

A vehicle according to a first aspect disclosed in the present specification includes a roof siderail extending along a front-rear direction, and a rear pillar connected to a rear end of the roof siderail. The roof siderail includes a roof siderail inner, and a roof siderail outer that covers the roof siderail inner from an outer side. The roof siderail outer has an upper flange, a lower flange, and a main portion. The upper flange extends along the front-rear direction, and is in contact with the roof siderail inner. The lower flange extends along the front-rear direction, is located on a lower side from the upper flange, and is in contact with the roof siderail inner. The main portion connects the upper flange and the lower flange. The main portion includes a first portion that extends in the front-rear direction and that is disposed across a gap from the roof siderail inner, and a second portion disposed between the first portion and the upper flange. A boundary line between the upper flange and the second portion is made up of a first bent portion in which the roof siderail outer is bent into a valley crease line on an outer face of the roof siderail outer. A boundary line between the second portion and the first portion is made up of a second bent portion in which the roof siderail outer is bent into a ridge crease line on the outer face of the roof siderail outer. The second bent portion extends toward the first bent portion in a rearward direction. A rear end of the second bent portion is connected to the first bent portion. The upper flange is welded to the rear pillar.

In the vicinity of the connection portion of the roof siderail and the rear pillar, the roof siderail tends to vibrate twisting about a welding point at which the upper flange and the rear pillar are welded. At this time, when an axis about which the roof siderail twists is not stable, a great noise will be generated. In the above vehicle, the second bent portion extends toward the first bent portion in a rearward direction, and the rear end of the second bent portion is connected to the first bent portion. That is to say, the second bent portion extends toward the welding point at which the upper flange is welded to the rear pillar, in the rearward direction. According to this configuration, when the roof siderail vibrates, the roof siderail readily twists about the second bent portion as an axis. That is to say, when the roof siderail vibrates in a twisting way, the axis about which the roof siderail twists tends to be stable. Accordingly, noise generated at the roof siderail can be suppressed.

In the vehicle according to the above aspect, the upper flange may be welded to the rear pillar at a first welding point and a second welding point, the second welding point being situated on an inner side from the first welding point in a vehicle-width direction.

In the vehicle according to the above aspect, at least one ridge crease line extending along an up-down direction may be provided on an outer face of the lower flange.

In the vehicle according to the above aspect, the vehicle may be provided with an inner panel, and the lower flange may be welded to the inner panel.

In the vehicle according to the above aspect, the first bent portion may extend linearly along the front-rear direction, and the second bent portion may extend in parallel with the first bent portion at a front portion of the roof siderail outer.

A second aspect disclosed in the present specification relates to a roof siderail of a vehicle. The roof siderail extends along a front-rear direction and is configured such that a rear end of the roof siderail is welded to a rear pillar. The roof siderail includes a roof siderail inner, and a roof siderail outer that covers the roof siderail inner from an outer side. The roof siderail outer includes an upper flange that extends along the front-rear direction, the upper flange being in contact with the roof siderail inner, a lower flange that extends along the front-rear direction, the lower flange being located on a lower side from the upper flange and being in contact with the roof siderail inner, and a main portion that connects the upper flange and the lower flange. The main portion includes a first portion that extends in the front-rear direction and that is disposed across a gap from the roof siderail inner, and a second portion disposed between the first portion and the upper flange, a boundary line between the upper flange and the second portion is made up of a first bent portion in which the roof siderail outer is bent into a valley crease line on an outer face of the roof siderail outer, a boundary line between the second portion and the first portion is made up of a second bent portion in which the roof siderail outer is bent into a ridge crease line on the outer face of the roof siderail outer, the second bent portion extends toward the first bent portion in a rearward direction, and a rear end of the second bent portion is connected to the first bent portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In a vehicle according to an example disclosed in the present specification, an upper flange may be welded to a rear pillar at a first welding point and a second welding point, the second welding point being situated on an inner side from the first welding point in a vehicle-width direction.

According to this configuration, load applied to the first welding point can be suppressed when a roof siderail vibrates.

In the vehicle according to an example disclosed in the present specification, at least one ridge crease line extending along an up-down direction may be provided on an outer face of a lower flange.

According to this configuration, vibration of the roof siderail can be suppressed.

Figure 1:
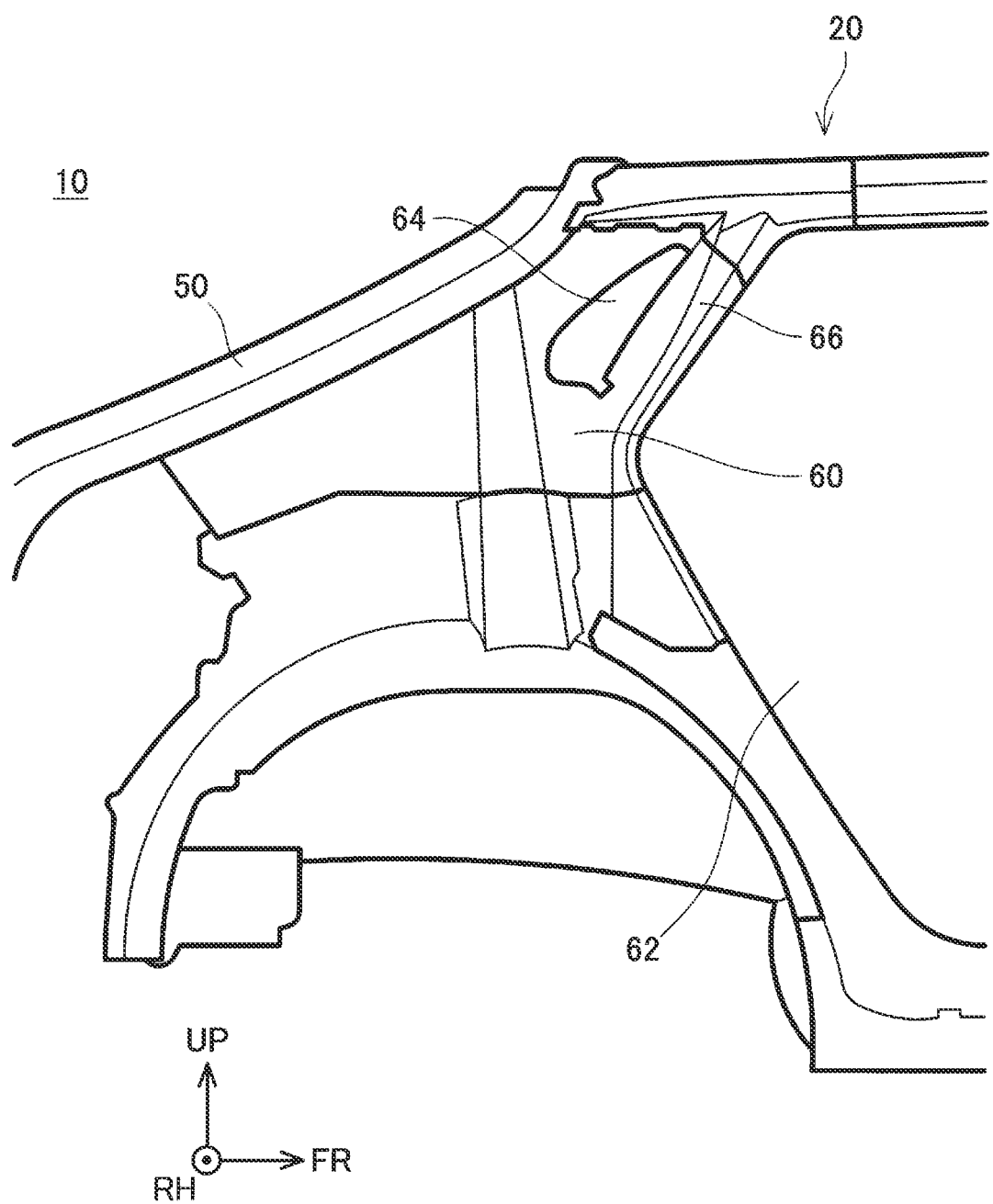
FIG. 1 is a view of a rear portion of a right side of a vehicle 10 according to an embodiment, as viewed from an outer side.

FIG. 1 illustrates a rear portion of a right side of a vehicle 10 according to an embodiment. Note that the structure of the rear portion of a left side of the vehicle 10 is the same as the structure of the rear portion of the right side, and accordingly just the structure of the rear portion of the right side of the vehicle 10 will be described below. Note that in the drawings, arrow FR indicates a front side of the vehicle 10 in a vehicle front-rear direction, arrow RH indicates the right side of the vehicle 10 in the vehicle width direction, and arrow UP indicates an upper side of the vehicle 10 in the vehicle up-down direction. As illustrated in FIG. 1, the vehicle 10 has a roof siderail 20, a rear pillar 50, and an inner panel 60. The roof siderail 20 extends along the front-rear direction of the vehicle 10. The roof siderail 20 is disposed along a right edge of the roof of the vehicle 10. The rear pillar 50 is connected to a rear end of the roof siderail 20. The rear pillar 50 extends diagonally rearward and downward from the rear end of the roof siderail 20. The inner panel 60 makes up a portion that is a side face of the vehicle 10 and that is adjacent to the roof siderail 20 and the rear pillar 50.

Figure 2:
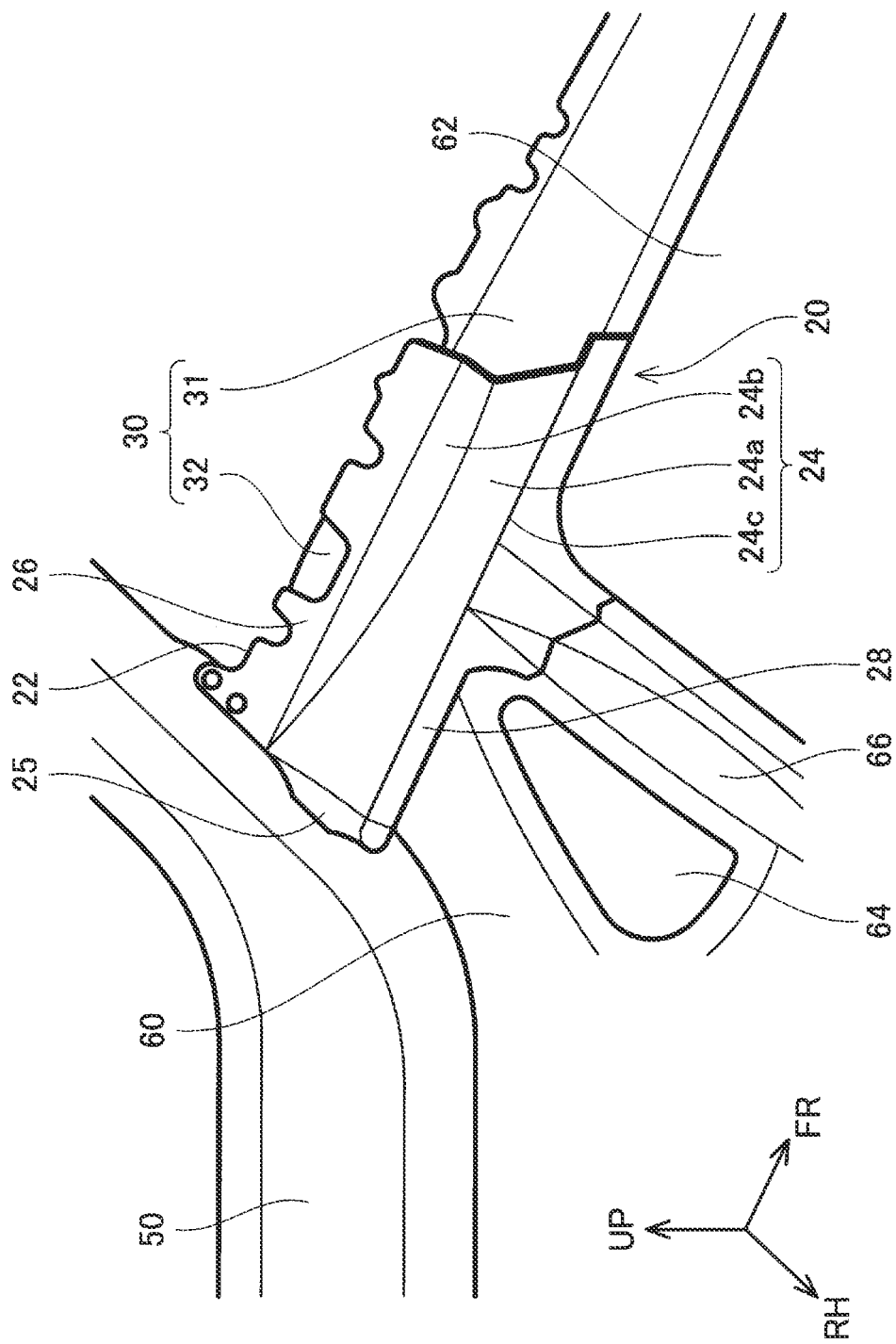
FIG. 2 is a perspective view of a connection portion of a roof siderail and a rear pillar, as viewed from the outer side.
Figure 3:
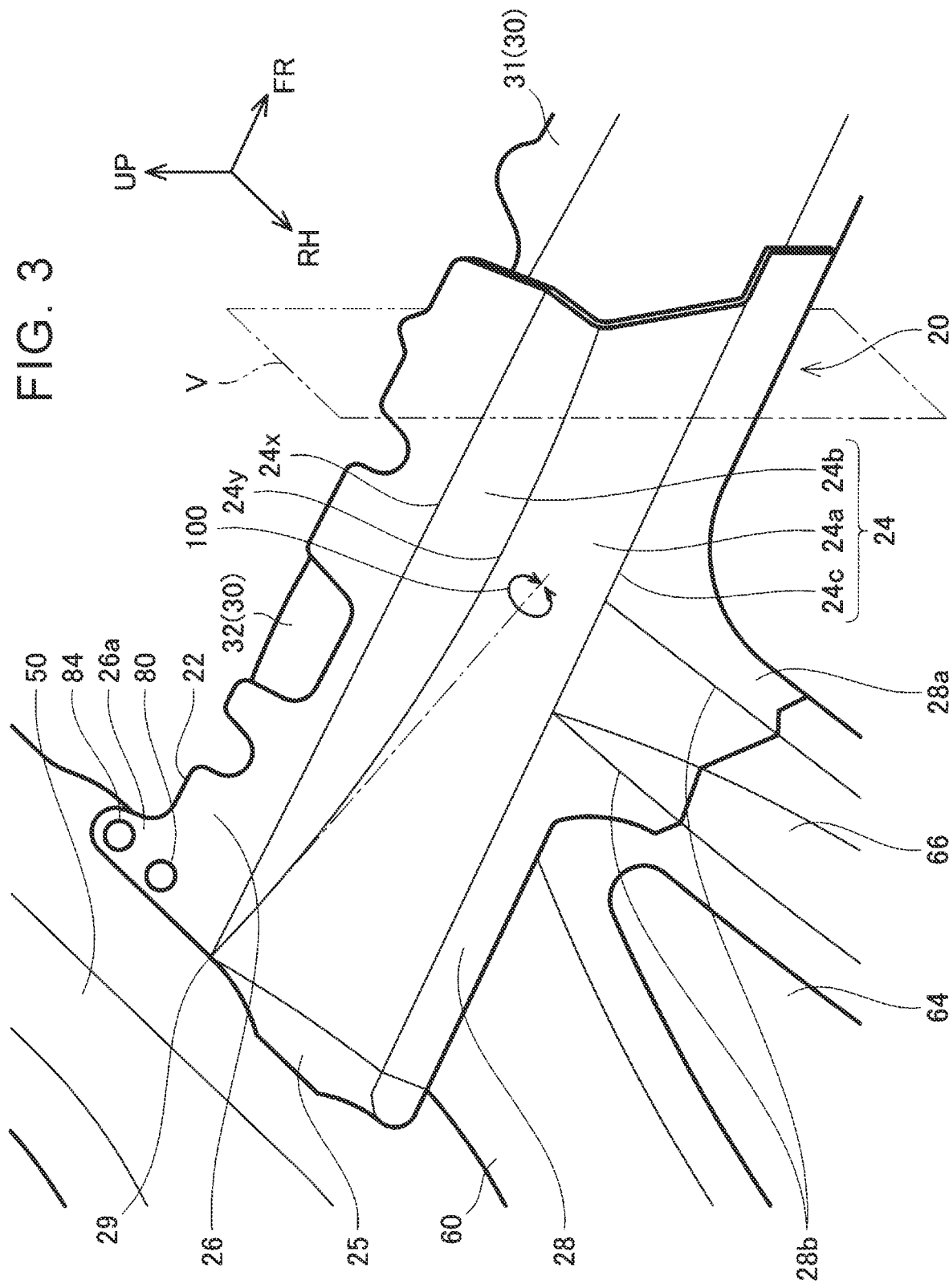
FIG. 3 is an enlarged perspective view of the connection portion of the roof siderail and the rear pillar, as viewed from the outer side.

As illustrated in FIGS. 2 and 3, the roof siderail 20 has a roof siderail outer 22 and a roof siderail inner 30. The roof siderail outer 22 is a member that makes up a portion of the roof siderail 20 facing the outer side of the vehicle 10. The roof siderail inner 30 is a member that makes up a portion of the roof siderail 20 facing the inner side (i.e., the cabin side) of the vehicle 10.

Figure 4:
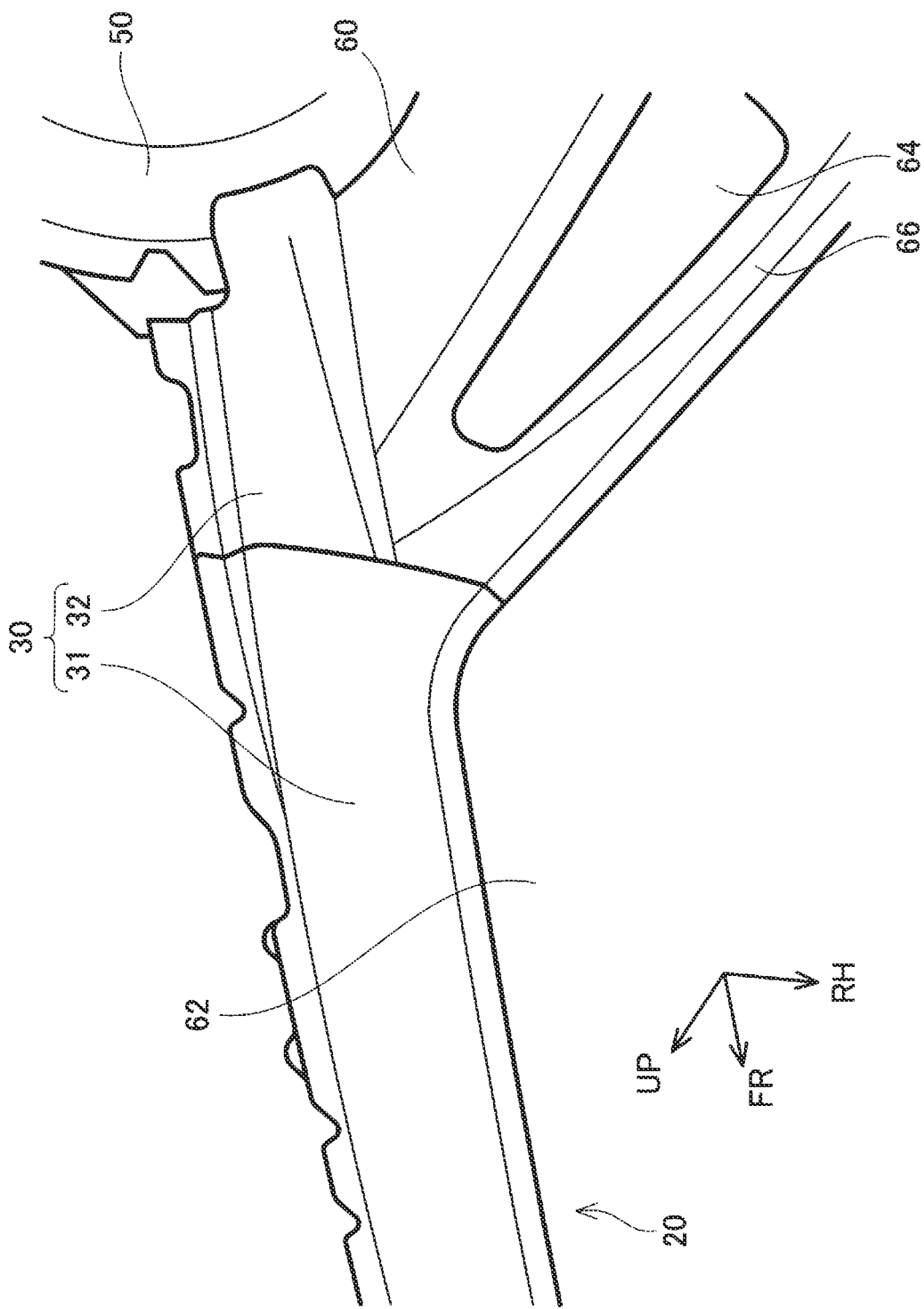
FIG. 4 is a perspective view of the connection portion of the roof siderail and the rear pillar, as viewed from an inner side.

As illustrated in FIG. 4, the roof siderail inner 30 has a first inner 31 and a second inner 32. The second inner 32 makes up a rear end portion of the roof siderail inner 30. A rear end of the second inner 32 is welded to the rear pillar 50. The second inner 32 is a member integrally formed with the inner panel 60. In other words, the second inner 32 is made up of a part of the inner panel 60. The first inner 31 is disposed on a front side of the second inner 32. A rear end of the first inner 31 is welded to a front end of the second inner 32.

Figure 5:
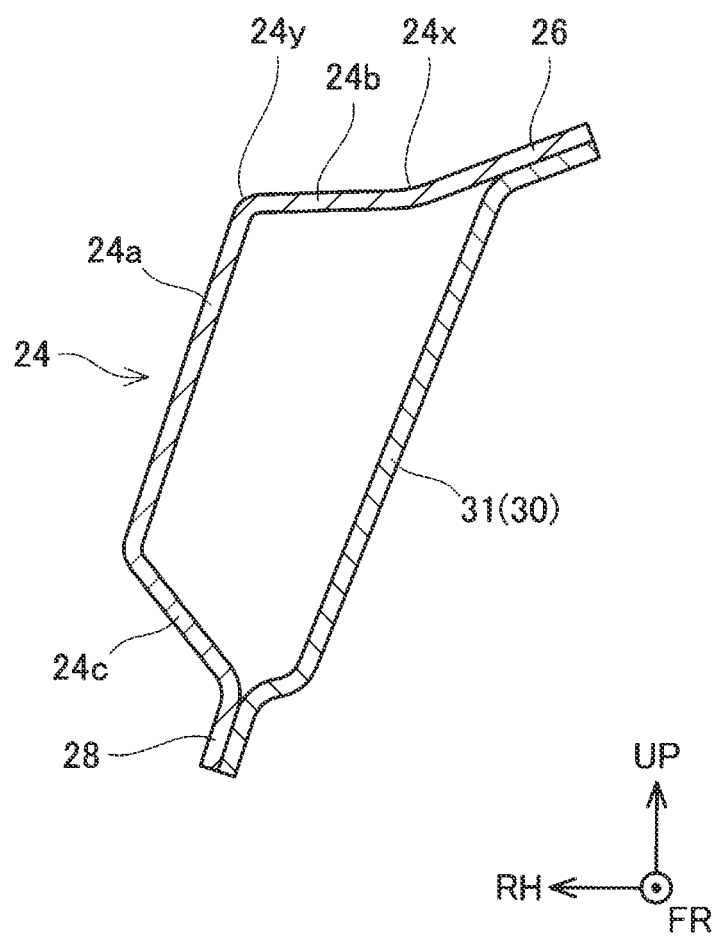
FIG. 5 is a cross-sectional view of the roof siderail.

As illustrated in FIGS. 2 and 3, the roof siderail outer 22 covers the outward face of the roof siderail inner 30. The roof siderail outer 22 has a main portion 24, an upper flange 26, and a lower flange 28. The upper flange 26 is provided on an upper side of the main portion 24, and the lower flange 28 is provided on a lower side of the main portion 24. The upper flange 26 extends elongated in the front-rear direction, and is in contact with the roof siderail inner 30. The upper flange 26 is welded to the roof siderail inner 30. The lower flange 28 extends elongated in the front-rear direction, and is in contact with the roof siderail inner 30. The lower flange 28 is welded to the roof siderail inner 30. FIG. 5 illustrates a cross-section of the roof siderail 20, taken along plane V in FIG. 3. As illustrated in FIG. 5, the main portion 24 connects the upper flange 26 and the lower flange 28. The main portion 24 has a first portion 24a, a second portion 24b, and a third portion 24c. The first portion 24a is disposed at a position facing the roof siderail inner 30. That is to say, a gap is provided between the first portion 24a and the roof siderail inner 30. The second portion 24b is disposed between the first portion 24a and the upper flange 26, and connects the first portion 24a and the upper flange 26. The third portion 24c is disposed between the first portion 24a and the lower flange 28, and connects the first portion 24a and the lower flange 28. Accordingly, the roof siderail outer 22 and the roof siderail inner 30 form a closed cross-section. As illustrated in FIGS. 2 and 3, the first portion 24a, the second portion 24b, and the third portion 24c extend elongated in the front-rear direction. That is to say, the roof siderail 20 has a tubular shape extending along the front-rear direction.

As illustrated in FIGS. 3 and 5, a first bent portion 24x is formed along a boundary line between the second portion 24b and the upper flange 26. At the first bent portion 24x, the roof siderail outer 22 is bent so that a valley crease line is formed on an outer face of the roof siderail outer 22. Also, a second bent portion 24y is formed along the boundary line between the second portion 24b and the first portion 24a. At the second bent portion 24y, the roof siderail outer 22 is bent so that a ridge crease line is formed on the outer face of the roof siderail outer 22. As illustrated in FIG. 3, the first bent portion 24x (i.e., the valley crease line) extends substantially linearly along the front-rear direction. At the front portion of the roof siderail outer 22, the second bent portion 24y (that is, the ridge crease line) extends substantially parallel to the first bent portion 24x. At a rear portion of the roof siderail outer 22, the second bent portion 24y extends toward the first bent portion 24x in a rearward direction. A rear end of the second bent portion 24y is connected to the first bent portion 24x at a connection point 29 located at a rear end of the roof siderail outer 22.

The upper flange 26 is welded to the rear pillar 50 at a welding point 80 located at the rear end portion thereof. The welding point 80 is located on the inner side from the connection point 29 in a vehicle-width direction. Also, a protruding portion 26a that protrudes inward in the vehicle-width direction is provided at the rear end portion of the upper flange 26. The upper flange 26 is welded to the rear pillar 50 at a welding point 84 provided on the protruding portion 26a. The welding point 84 is located on the inner side from the welding point 80 in the vehicle-width direction.

The roof siderail outer 22 has a rearward flange 25 extending rearward from a rear end of the first portion 24a. The rearward flange 25 is welded to the rear pillar 50.

As illustrated in FIG. 1, the inner panel 60 has an opening 64 situated between a rear door opening 62 and the rear pillar 50. A quarter glass is installed in the opening 64. A pillar 66 is provided between the opening 64 and the rear door opening 62. The pillar 66 extends in a downward direction from the roof siderail 20. As illustrated in FIG. 3, the lower flange 28 of the roof siderail outer 22 has a protruding portion 28a that protrudes downward along the pillar 66. The protruding portion 28a is welded to the inner panel 60. A plurality of ridge crease lines 28b is provided on an outer face of the protruding portion 28a. Each of the ridge crease lines 28b extends along the up-down direction. While a plurality of ridge crease lines 28b is provided in the present embodiment, a singular (one) ridge crease line may be provided in another embodiment.

When the vehicle 10 is traveling, the roof siderail 20 vibrates in the vicinity of the connection portion of the roof siderail 20 and the rear pillar 50. The roof siderail 20 vibrates twisting about the welding point 80 at which the upper flange 26 and the rear pillar 50 are welded. At this time, when an axis about which the roof siderail 20 twists is not stable, a great noise will be generated. As illustrated in FIG. 3, in the vehicle 10 according to the present embodiment, the second bent portion 24y extends toward the first bent portion 24x in the rearward direction, and the second bent portion 24y is connected to the first bent portion 24x. Accordingly, the second bent portion 24y extends toward the welding point 80 in the vicinity of the rear end of the roof siderail 20. Thus, as indicated by arrow 100 in FIG. 3, the roof siderail 20 tends to vibrate twisting about an axis extending along the rearward portion of the second bent portion 24y. Accordingly, the axis about which the roof siderail 20 twists is stable. As a result, the noise generated in the roof siderail 20 is suppressed. Further, in the vehicle 10 according to the embodiment, the protruding portion 28a of the lower flange 28 has the ridge crease lines 28b extending in the up-down direction, and accordingly has a structural shape that does not readily collapse. Accordingly, vibration in a direction in which the roof siderail 20 twists is suppressed. Thus, noise generated at the roof siderail 20 is suppressed more effectively.

Also, when the roof siderail 20 vibrates, a great load is applied to the welding point 80 at which the upper flange 26 and the rear pillar 50 are welded. With respect to this, the upper flange 26 is also welded to the rear pillar 50 at the welding point 84 located on the inner side from the welding point 80 in the vehicle-width direction, in the vehicle 10 according to the embodiment. Accordingly, the load applied to the welding point 80 can be reduced. Also, providing the welding point 84 suppresses vibration of the roof siderail 20 more effectively. Thus, noise generated at the roof siderail 20 is suppressed more effectively.

Although an embodiment is described in detail above, this is merely exemplary and is not intended to limit the scope of the claims. The technology described in the claims includes various modifications and alterations of the specific examples exemplified above. The technical elements described in the present specification and the drawings exhibit technical utility alone or in various combinations, and are not limited to the combinations described in the claims at the time of filing. Also, the technology exemplified in the present specification and the drawings achieve a plurality of objects at the same time, and achieving one of the objects itself has technological utility.

What is claimed is:

1. A vehicle comprising:
a roof siderail extending along a front-rear direction; and
a rear pillar connected to a rear end of the roof siderail, wherein:
the roof siderail includes a roof siderail inner, and a roof siderail outer that covers the roof siderail inner from an outer side;
the roof siderail outer includes
an upper flange that extends along the front-rear direction, the upper flange being in contact with the roof siderail inner,
a lower flange that extends along the front-rear direction, the lower flange being located on a lower side from the upper flange and being in contact with the roof siderail inner, and
a main portion that connects the upper flange and the lower flange;
the main portion includes a first portion that extends in the front-rear direction and that is disposed across a gap from the roof siderail inner, and a second portion disposed between the first portion and the upper flange;
a boundary line between the upper flange and the second portion is made up of a first bent portion in which the roof siderail outer is bent into a valley crease line on an outer face of the roof siderail outer;
a boundary line between the second portion and the first portion is made up of a second bent portion in which the roof siderail outer is bent into a ridge crease line on the outer face of the roof siderail outer;
the second bent portion extends toward the first bent portion in a rearward direction;
a rear end of the second bent portion is connected to the first bent portion; and
the upper flange is welded to the rear pillar at a first welding point and a second welding point, the second welding point being situated on an inner side from the first welding point in a vehicle-width direction.

2. The vehicle according to claim 1, wherein at least one ridge crease line extending along an up-down direction is provided on an outer face of the lower flange.

3. The vehicle according to claim 2, wherein:
the vehicle is provided with an inner panel; and
the lower flange is welded to the inner panel.

4. The vehicle according to claim 1, wherein:
the first bent portion extends linearly along the front-rear direction; and
the second bent portion extends in parallel with the first bent portion at a front portion of the roof siderail outer.

5. A roof siderail of a vehicle, the roof siderail extending along a front-rear direction and being configured such that a rear end of the roof siderail is welded to a rear pillar, the roof siderail comprising:
a roof siderail inner; and
a roof siderail outer that covers the roof siderail inner from an outer side, wherein:
the roof siderail outer includes
an upper flange that extends along the front-rear direction, the upper flange being in contact with the roof siderail inner,
a lower flange that extends along the front-rear direction, the lower flange being located on a lower side from the upper flange and being in contact with the roof siderail inner, and
a main portion that connects the upper flange and the lower flange;
the main portion includes a first portion that extends in the front-rear direction and that is disposed across a gap from the roof siderail inner, and a second portion disposed between the first portion and the upper flange;
a boundary line between the upper flange and the second portion is made up of a first bent portion in which the roof siderail outer is bent into a valley crease line on an outer face of the roof siderail outer;
a boundary line between the second portion and the first portion is made up of a second bent portion in which the roof siderail outer is bent into a ridge crease line on the outer face of the roof siderail outer;

the second bent portion extends toward the first bent portion in a rearward direction; and a rear end of the second bent portion is connected to the first bent portion.

6. A vehicle comprising:

a roof siderail extending along a front-rear direction; and a rear pillar connected to a rear end of the roof siderail, wherein:

the roof siderail includes a roof siderail inner, and a roof siderail outer that covers the roof siderail inner from an outer side;

the roof siderail outer includes
- an upper flange that extends along the front-rear direction, the upper flange being in contact with the roof siderail inner,
- a lower flange that extends along the front-rear direction, the lower flange being located on a lower side from the upper flange and being in contact with the roof siderail inner, and
- a main portion that connects the upper flange and the lower flange;

the main portion includes a first portion that extends in the front-rear direction and that is disposed across a gap from the roof siderail inner, and a second portion disposed between the first portion and the upper flange;

a boundary line between the upper flange and the second portion is made up of a first bent portion in which the roof siderail outer is bent into a valley crease line on an outer face of the roof siderail outer;

a boundary line between the second portion and the first portion is made up of a second bent portion in which the roof siderail outer is bent into a ridge crease line on the outer face of the roof siderail outer;

the second bent portion extends toward the first bent portion in a rearward direction;

a rear end of the second bent portion is connected to the first bent portion;

the upper flange is welded to the rear pillar;

at least one ridge crease line extending along an up-down direction is provided on an outer face of the lower flange.

7. The vehicle according to claim 6, wherein:

the vehicle is provided with an inner panel; and the lower flange is welded to the inner panel.

8. The vehicle according to claim 6, wherein:

the first bent portion extends linearly along the front-rear direction; and the second bent portion extends in parallel with the first bent portion at a front portion of the roof siderail outer.

* * * * *